US010641524B2

(12) United States Patent
Lavine et al.

(10) Patent No.: US 10,641,524 B2
(45) Date of Patent: May 5, 2020

(54) HIGH TEMPERATURE SYNTHESIS FOR POWER PRODUCTION AND STORAGE

(71) Applicant: The Regents of the University of California, Oakland, CA (US)

(72) Inventors: Adrienne Gail Lavine, Sherman Oaks, CA (US); Richard Edward Wirz, Los Angeles, CA (US); Hamarz Aryafar, Los Angeles, CA (US); Chen Chen, Los Angeles, CA (US); Keith Lovegrove, O'Connor (AU)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/739,125

(22) PCT Filed: Jun. 27, 2016

(86) PCT No.: PCT/US2016/039640
§ 371 (c)(1),
(2) Date: Dec. 21, 2017

(87) PCT Pub. No.: WO2016/210433
PCT Pub. Date: Dec. 29, 2016

(65) Prior Publication Data
US 2018/0180325 A1    Jun. 28, 2018

Related U.S. Application Data

(60) Provisional application No. 62/185,472, filed on Jun. 26, 2015.

(51) Int. Cl.
*F28D 20/00*      (2006.01)
*F24S 60/00*      (2018.01)
(Continued)

(52) U.S. Cl.
CPC .......... *F24S 60/00* (2018.05); *B65G 5/00* (2013.01); *F04B 45/04* (2013.01); *F04B 45/043* (2013.01);
(Continued)

(58) Field of Classification Search
CPC . F24J 2/34; F24J 2/12; F24J 2/07; F24J 2/14; F28D 20/003; B65G 5/00
See application file for complete search history.

(56) References Cited

U.S. PATENT DOCUMENTS 2,659,209 A * 11/1953 Phelps .................... B65G 5/00
                                                405/133
3,089,309 A *  5/1963 Closs ..................... F17C 3/005
                                                 405/53

(Continued)

OTHER PUBLICATIONS

A review of Ammonia-based Thermochemical Energy storage concentrating solar power to Rebecca Dunn (Year: 2012).*

(Continued)

*Primary Examiner* — Mark A Laurenzi
*Assistant Examiner* — Shafiq Mian
(74) *Attorney, Agent, or Firm* — Christensen O'Connor Johnson Kindness, PLLC (57) ABSTRACT

Thermochemical energy storage (TCES) for concentrating solar power (CSP) systems provides higher energy density than sensible energy storage systems. An ammonia-based TCES system dissociates endothermically into hydrogen and nitrogen. The stored energy is released when supercritical hydrogen and nitrogen react exothermically to synthesize ammonia. Prior ammonia synthesis systems are unable to produce temperatures consistent with modern power blocks requiring a working fluid, for example steam or carbon dioxide, to be heated to greater than 600° C., for example about 650° C. An ammonia synthesis system heats steam from, for example 350° C. to 650° C. under pressure of (Continued)

about 26 MPa. The hydrogen and nitrogen are preheated with a flow of supercritical fluid prior to the synthesis step to provide reaction rates sufficient to heat power block working fluid to the desired temperature.

12 Claims, 4 Drawing Sheets

(51) Int. Cl.
- *F04B 45/04* (2006.01)
- *F24S 23/74* (2018.01)
- *F24S 20/20* (2018.01)
- *B65G 5/00* (2006.01)
- *F24S 23/71* (2018.01)

(52) U.S. Cl.
CPC ............ *F24S 20/20* (2018.05); *F24S 23/74* (2018.05); *F28D 20/003* (2013.01); *F24S 23/71* (2018.05); *Y02E 10/41* (2013.01); *Y02E 10/45* (2013.01); *Y02E 60/142* (2013.01); *Y02E 70/30* (2013.01)

(56) References Cited

U.S. PATENT DOCUMENTS

| | | | | |
|---|---|---|---|---|
| 5,685,362 | A * | 11/1997 | Brown | F24T 10/20 165/45 |
| 6,129,514 | A | 10/2000 | Shiga et al. | |
| 6,588,212 | B1 * | 7/2003 | Wallace | F01K 23/068 60/39.12 |
| 8,272,216 | B2 * | 9/2012 | Nakamura | C01B 3/042 123/3 |
| 2002/0177629 | A1 * | 11/2002 | O'Beck | C01B 3/382 518/703 |
| 2004/0105795 | A1 * | 6/2004 | Gough | B01J 8/067 422/201 |
| 2004/0244377 | A1 * | 12/2004 | Geijsel | C01B 3/36 60/653 |
| 2005/0247050 | A1 * | 11/2005 | Kaboord | C01C 1/006 60/286 |
| 2006/0127216 | A1 * | 6/2006 | Suga | F01D 5/28 415/198.1 |
| 2008/0138675 | A1 * | 6/2008 | Jang | C25B 1/02 132/248 |
| 2010/0003184 | A1 * | 1/2010 | Nakamura | C01B 3/025 423/359 |
| 2010/0098599 | A1 * | 4/2010 | Mankins | B01J 19/0093 422/148 |
| 2011/0120127 | A1 * | 5/2011 | Lippmann | C01B 3/025 60/647 |
| 2014/0219904 | A1 * | 8/2014 | McAlister | F23G 5/02 423/345 |
| 2014/0238634 | A1 * | 8/2014 | Ronnebro | F28D 20/003 165/10 |
| 2014/0338335 | A1 * | 11/2014 | Simpkin | F02C 1/06 60/726 |
| 2016/0152483 | A1 * | 6/2016 | Takeshima | C01C 1/0405 423/359 |

OTHER PUBLICATIONS

Dunn, Rebecca, et al., "A Review of Ammonia-Based Thermochemical Energy Storage for Concentrating Solar Power," Proceeding of the IEEE, vol. 100, Issue 2, Feb. 2, 2012, pp. 391-400.

International Search Report and Written Opinion dated Sep. 15, 2016, issued in corresponding International Application No. PCT/US2016/039640, filed Jun. 27, 2016, 8 pages.

* cited by examiner

HIGH TEMPERATURE SYNTHESIS FOR POWER PRODUCTION AND STORAGE

CROSS-REFERENCE TO RELATED APPLICATION

This application claims the benefit of Provisional Application No. 62/185,472, filed Jun. 26, 2015; the disclosure of said application is hereby incorporated by reference herein.

STATEMENT OF GOVERNMENT LICENSE RIGHTS

This invention was made with Government support under Award Number DE-EE0006536 awarded by the Office of Energy Efficiency and Renewable Energy (EERE), U.S. Department of Energy. The Government has certain rights in the invention.

BACKGROUND

Concentrated solar power (CSP) plants typically provide dispatchable power by integrating thermal energy storage (TES) system, e.g., molten salt tanks with an electrical generator power block. However, thermochemical energy storage (TCES) in which energy is stored in chemical bonds, has advantages over TES. In particular, TCES systems may provide higher energy density, and experience lower energy losses during the storing operation. Ammonia-based TCES systems have the potential to be more efficient for long-term storage than compressed air energy storage, pumped hydro-electric energy storage, vanadium flow battery storage, or thermal energy storage.

In ammonia-based thermochemical energy storage systems for CSP, ammonia ($NH_3$) is dissociated endothermically as it absorbs solar energy during daylight hours, producing supercritical hydrogen ($H_2$) and nitrogen ($N_2$). The stored energy can be released on demand when the $H_2$ and $N_2$ react exothermically to synthesize ammonia. The released thermal energy can then be used to generate electricity. A 1 $kW_{sol}$ closed loop ammonia-based TCES system and a 15 $kW_{sol}$ ammonia-based TCES system for dish power plants have been built and tested. The system demonstrated ammonia dissociation on a dish concentrator and subsequent energy recovery at temperatures high enough for electricity generation, but did not demonstrate heating of a working fluid. In particular, ammonia synthesis has not been shown to reach temperatures consistent with modern power blocks. For example, modern steam-driven Rankine cycle power blocks may be configured for supercritical steam heated to about 600° C., 650° C., or more.

A TCES system with a catalytic ammonia synthesis reactor is described below. In one embodiment the synthesis reactor is configured to operate at about 30 MPa. The effect of various parameters on the reactor performance has been investigated, to optimize the system for low-cost electricity generation.

For ease of expression herein, the water, which may be supercritical or liquid, is generally referred to as "steam." The $N_2$, $H_2$, $NH_3$ mixture is generally referred to as "the gas," even though the species are all supercritical within the reactor and $NH_3$ is liquid in the lower temperature portion of the system.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method for heating a working fluid for a power block to a temperature greater than 600° C., the method includes providing a reservoir containing a thermochemical energy storage (TCES) fluid, for example ammonia, wherein the TCES fluid can transition between a higher-energy dissociated state, for example $N_2$ and $H_2$, and a lower-energy undissociated state, for example $NH_3$. Solar energy is stored by flowing the TCES fluid through a dissociation reactor and irradiating the reactor with concentrated (or focused) solar energy, to transition at least some of the TCES fluid to the dissociated state and returning it to the reservoir. The stored energy is extracted by flowing the energized TCES fluid through a synthesis reactor such that at least a portion of the TCES fluid exothermically transitions back to the lower-energy, undissociated state and transfers the extracted energy to a power block working fluid. The higher-energy TCES fluid is preheated before flowing through the synthesis reactor by diverting and transferring heat from a portion of the heated power block working fluid, such that the power block working fluid is heated in the dissociation reactor to a temperature greater than 600° C. For example, the power block working fluid may be supercritical steam or carbon dioxide.

In an embodiment the lower-energy undissociated working fluid comprises ammonia, and the higher energy dissociated state comprises hydrogen and nitrogen.

In an embodiment the synthesis reactor includes a catalyst that facilitates the synthesis of ammonia from hydrogen and nitrogen. For example, the catalyst may be nickel, iron-oxide, iron-cobalt, or ruthenium.

In an embodiment the reactor includes at least one inner tube containing a bed of catalyst wherein the TCES flows through the inner tube, and an outer tube that surrounds the at least one inner tube wherein the power block working fluid flows through the outer tube around the at least one inner tube. In some embodiments the diverted portion of the working fluid is returned to the reactor after preheating the TCES flow.

In an embodiment the reservoir comprises a bored hole defining a cylindrical bore wall, a vessel comprising a side wall that is in contact with the cylindrical bore wall, a lower end, and an upper cap fixed to an upper end of the side wall, such that the side wall, lower end, and upper cap define a sealed vessel, and further comprising at least one port through the upper cap that provides fluid communication with the sealed vessel.

In an embodiment the side wall is grouted to the cylindrical bore hole wall.

In an embodiment an upper end of the sealed vessel is disposed below ground level.

In an embodiment a concrete plug is provided adjacent an upper side of the upper cap, wherein the concrete plug is secured to the cylindrical bore wall.

In an embodiment the reservoir further comprises an above ground portion.

A thermochemical energy storage system (TCES) for heating a power block working fluid includes a reservoir for the TCES fluid, for example ammonia, hydrogen, and nitrogen, a first pumping system for transporting a first flow of the TCES fluid from the reservoir to a source of thermal energy such that the first flow of the TCES fluid stores energy from the source of thermal energy by partially dissociating, and returning the first flow of TCES fluid with the stored energy to the reservoir; and a second pumping system configured to transport a second flow of TCES fluid with the stored energy from the reservoir to a synthesis reactor that is configured to synthesize ammonia from the TCES fluid and transfer thermal energy generated by the synthesis of ammonia to the working fluid for the power block, and returning the second flow of TCES fluid to the reservoir. A heat exchanger is provided to preheat the second flow of TCES fluid prior to the synthesis of ammonia, such that after the synthesis of ammonia the second flow of TCES fluid is heated to a temperature of at least 600° C.

In an embodiment the heat exchanger preheats the second flow of TCES fluid by exchanging energy from the working fluid for the power block.

In an embodiment the working fluid for the power block is water or carbon dioxide.

In an embodiment the working fluid for the power block is steam that is heated to supercritical steam.

In an embodiment the synthesis reactor includes a catalyst, for example, iron-oxide, nickel, iron-cobalt, or ruthenium that facilitates the synthesis of ammonia from hydrogen and nitrogen.

In an embodiment the synthesis reactor includes at least one inner tube containing a bed of catalyst and receives the second flow of TCES fluid. An outer tube surrounds the inner tube, and the power block working fluid flows through the outer tube around the at least one inner tube.

In an embodiment the reservoir is formed from a bored hole defining a cylindrical bore wall, a vessel comprising a side wall that is in contact with the cylindrical bore wall, a lower end, and an upper cap fixed to an upper end of the side wall, such that the side wall, lower end and upper cap define a sealed vessel, and further comprising at least one port through the upper cap that provides fluid communication with the sealed vessel. In an embodiment the side wall is grouted to the cylindrical bore hole wall, and an upper end of the sealed vessel is disposed below ground level.

In an embodiment a concrete plug adjacent an upper side of the upper cap, wherein the concrete plug is secured to the cylindrical bore wall.

In an embodiment the reservoir further comprises a separated above-ground portion.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
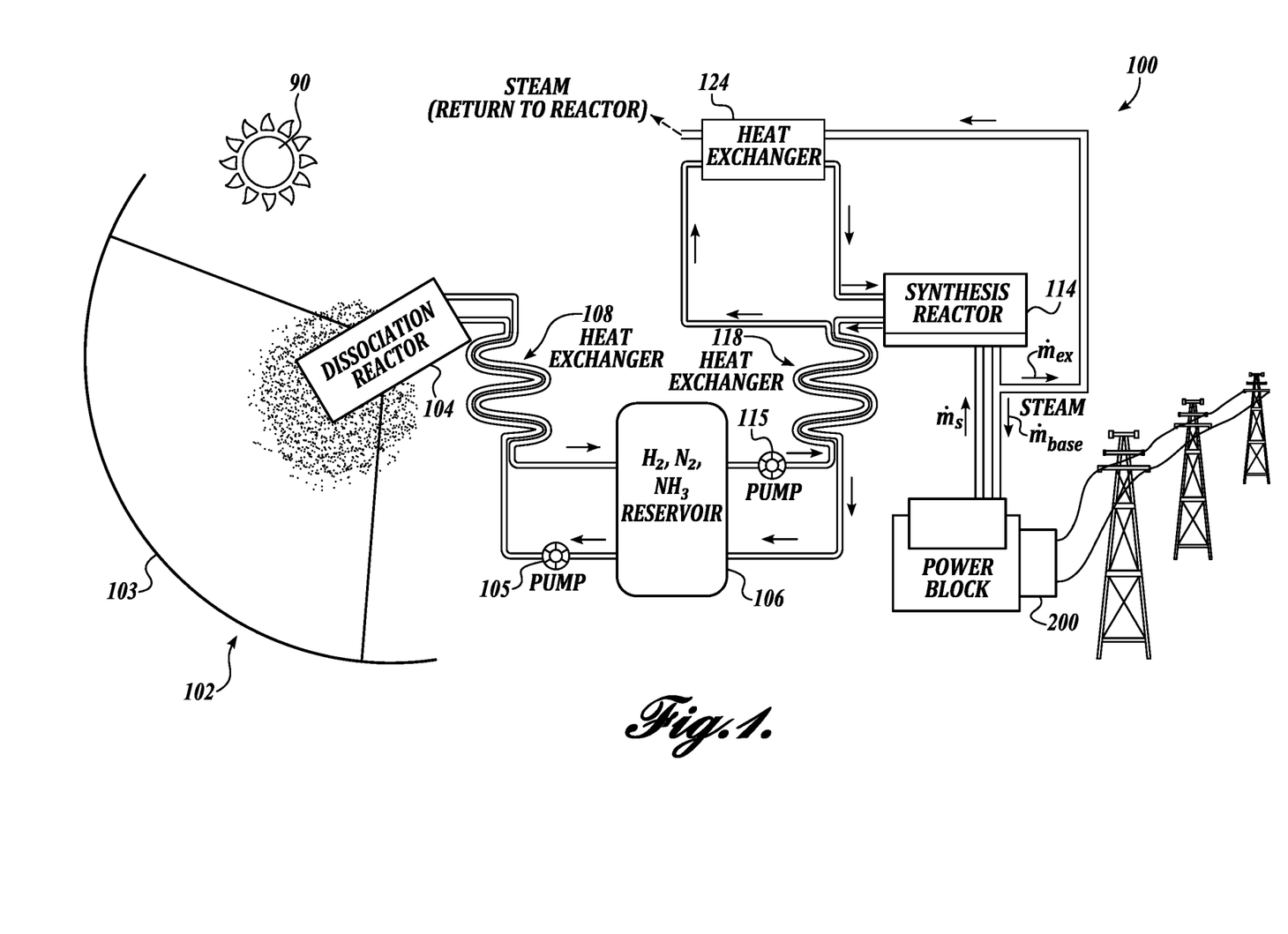
FIG. 1 illustrates a concentrated solar power (CSP) system coupled to a power block for providing electrical energy to a grid, and having with a thermochemical energy storage system (TCES) in accordance with the present invention.

Nomenclature $c_p$ Heat capacity of the reacting gas mixture, J/(kg·K)
D Diameter, m
$D_{eff}$ Effective diffusivity, m²/s
$E_a$ Activation energy, J/mol
$f_{NH3}$ Ammonia mass fraction
h Heat transfer coefficient, W/(m²·K)
ΔH Heat of reaction, J/kg
k Thermal conductivity, W/(m·K)
$k_{o,m}$ Pre-exponential factor, kg/(m³·s)
$K_p$ Equilibrium constant
L Reactor length, m
ṁ Mass flow rate, kg/s
Nu Nusselt number
P Perimeter of tube, m
p Pressure, Pa
$p_j$ Partial pressure, where j indicates species, Pa
q Heat transfer rate, W
$q_w''$ Heat flux, W/m²
r Radial dimension, m
r''' Rate of ammonia synthesis, kg/s
$R_u$ Universal gas constant, J/(mol·K)
T Temperature, ° C.
U Overall heat transfer coefficient, W/(m²·K)
V Volume, (m³)
v Velocity of the reacting gas mixture, m/s
W Wall thickness, m
x Axial dimension, m
Greek letters
ρ Density of the gas mixture (kg/m³)
Subscripts
c catalyst
eff effective
g gas mixture ($N_2+3H_2$ and $NH_3$)
i inner
in inlet
o outer
out outlet
ph preheat
s steam
si inlet of steam stream
so outlet of steam stream
w wall FIG. 1 shows a concentrated solar power (CSP) system 100 with a thermochemical energy storage (TCES) system in accordance with the present invention, with a power block 200 for generating electricity. The power block 200 may comprise a Rankine cycle power block, a Brayton cycle power block, or another cycle or combination cycle power block, as are known in the art. Although the description below may refer to steam as the working fluid for the selected power block 200, it will be appreciated that other working fluids may be desirable for a selected power block, and "steam" as used herein will be understood to encompass other power block working fluids, for example carbon dioxide. An exemplary power block using carbon dioxide as a working fluid is disclosed in U.S. Patent Application Publication 2012/0216536 to Mu et al., which is hereby incorporated by reference.

The CSP system 100 shown in FIG. 1 includes a solar energy collector 102 configured to concentrate solar energy from the sun 90 onto a dissociation reactor/receiver 104. One or more reflectors 103 may concentrate sunlight onto the dissociation reactor 104. In exemplary embodiments the reflector 103 may be a parabolic dish reflector, a compact linear Fresnel reflector, a parabolic trench reflector, a plurality of separate reflectors (heliostats) that are controlled to reflect sunlight onto the reactor 104, or the like. The dissociation reactor 104 receives a flow of TCES fluid from a reservoir 106 (e.g., via pump 105). In a current embodiment the TCES fluid includes ammonia ($NH_3$), nitrogen ($N_2$) and hydrogen ($H_2$).

The TCES fluid entering the dissociation reactor 104 typically has a relatively high ammonia concentration. The concentrated solar energy heats the TCES fluid in the dissociation reactor 104 in the presence of a suitable catalyst as are known in the art. Exemplary catalysts include nickel, iron-oxide, iron-cobalt, and ruthenium. In the current embodiment the solar heating causes at least a portion of the ammonia to endothermically dissociate such that the TCES fluid exiting the dissociation reactor 104 has a relatively lower concentration of ammonia, and a relatively higher concentration of nitrogen and hydrogen. The TCES fluid flowing out of the dissociation reactor 104 is returned to the reservoir 106. Optionally, a first counterflow heat exchanger 108 is provided and configured to facilitate thermal energy transfer from the relatively hot TCES fluid exiting the dissociation reactor 106 to the relatively cooler TCES fluid entering the dissociation reactor 104.

Figure 2:
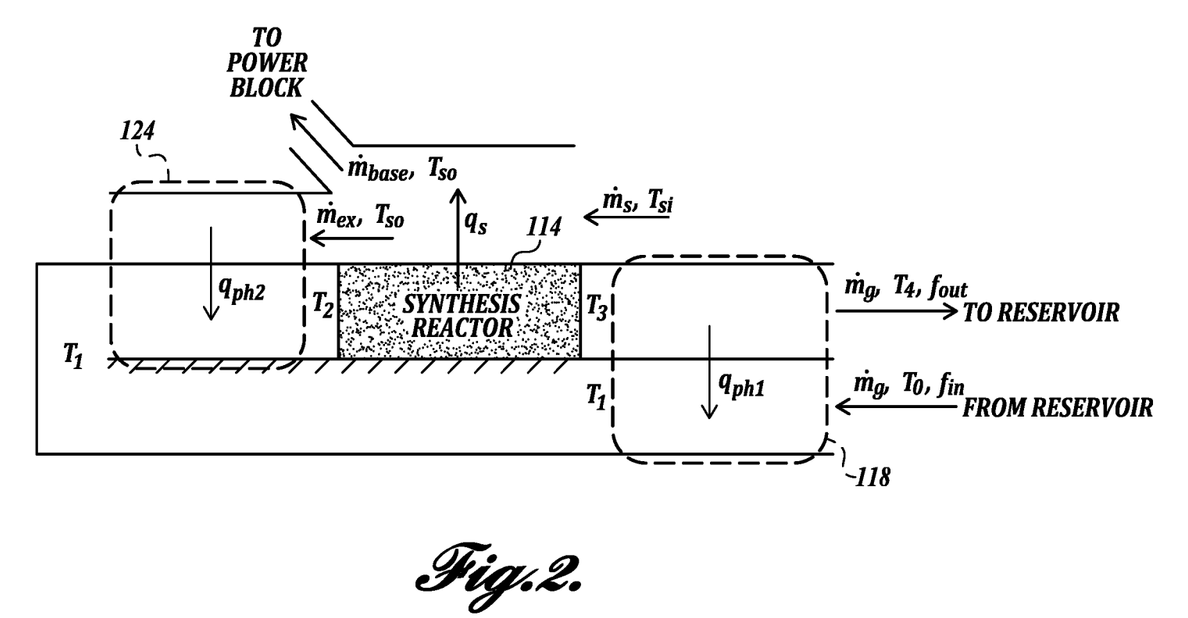
FIG. 2 is a schematic view of the synthesis portion of the TCES system shown in FIG. 1.

The energy extraction (or synthesis) portion of the CSP system 100 for the current embodiment is shown on the right side in FIG. 1. Refer also to FIG. 2, which shows a schematic view of the synthesis portion of the CSP system 100.

Relatively dissociated TCES fluid from the reservoir 106 ($\dot{m}_g$, $T_0$, $f_{in}$) is transported (e.g., with pump 115) from the reservoir 106 to the synthesis reactor 114. The TCES fluid is initially preheated in a second counterflow heat exchanger 118 ($q_{ph1}$) from a temperature $T_0$ to a temperature $T_1$ by the gas exiting the synthesis reactor 114 ($\dot{m}_g$, $T_4$, $f_{out}$). This initial preheating is only sufficient to bring the TCES fluid close to the synthesis reactor 114 exit temperature $T_3$, and not to the desired reactor 114 inlet temperature $T_2$. The TCES fluid is therefore preheated further to heat the incoming TCES fluid to the desired inlet temperature $T_2$.

This secondary preheating can be accomplished in various ways. For example, in the exemplary design shown in FIGS. 1 and 2, the incoming TCES fluid is further preheated by a bleed stream of supercritical steam (or other working fluid) from the synthesis reactor 114 in a heat exchanger 124 ($q_{ph2}$). In alternative embodiments the temperature of the TCES fluid may be raised to the desired temperature by other means, for example by self-heating in a distinct synthesis reactor.

In the currently preferred embodiment a portion of the steam heated in the synthesis reactor 114 is used to further preheat the TCES fluid entering the synthesis reactor 114. As seen most clearly in FIG. 2, the flow of steam ($\dot{m}$, $T_{si}$) is heated in the synthesis reactor 114 from $T_{si}$=350° C. to $T_{so}$=650° C. by thermal energy $q_s$ from the exothermic synthesis reaction. A desired base steam flow rate, $\dot{m}_{base}$, (e.g., 12.5 g/s) exits the reactor 114 to be used for electricity generation in the power block 200. An additional portion of the steam, $\dot{m}_{ex}$, (e.g., at $T_{so}$=650° C.) is used to preheat the TCES fluid entering the reactor 114 before or during the exothermic synthesis reaction. The additional portion of the steam used for the secondary preheating may be returned to the reactor 114 steam flow.

Figure 3:
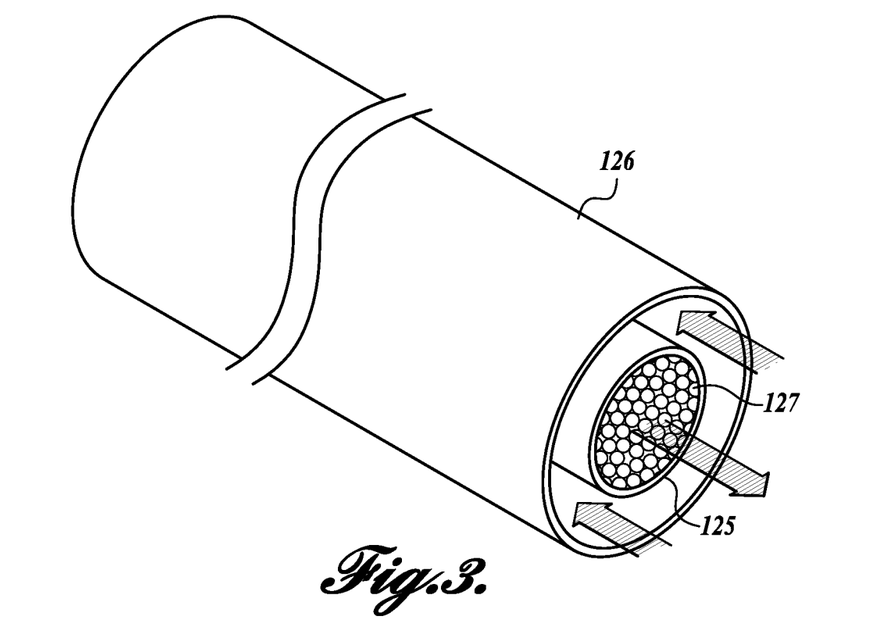
FIG. 3 illustrates a concentric tube configuration for the synthesis reactor and/or the secondary heat exchanger for the system shown in FIG. 1.
Figure 4:
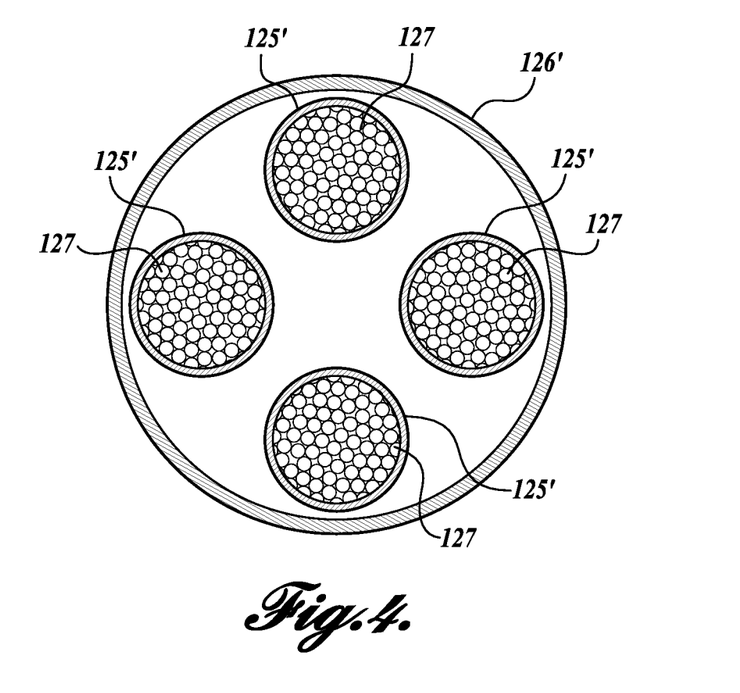
FIG. 4 illustrates a shell in tube configuration for the synthesis reactor and/or the secondary heat exchanger for the system shown in FIG. 1.

Two exemplary configurations for the design of the synthesis reactor 114, (which may be the same as the configuration for the secondary preheater 124 and/or the dissociation reactor 104) are illustrated diagrammatically in FIGS. 3 and 4. The first configuration 124 shown in FIG. 3 comprises an inner tube 125 disposed within an outer tube 126. The inner tube 125 (for the synthesis reactor 114) contains a catalytic packed bed comprising the synthesis catalyst. Exemplary catalysts include nickel, iron-oxide, iron-cobalt, and ruthenium. The TCES fluid flows through the catalyst 127 in the inner tube 125, and the steam (or other power block working fluid) flows in counterflow in the annulus between the inner tube 125 and the outer tube 126. In an alternative embodiment the power block working fluid flows in the inner tube, and the TCES fluid flows through the catalyst 127 in the annulus between the inner tube 125 and the outer tube 126.

The second exemplary configuration 124' is shown in FIG. 4, and comprises a shell-and-tube assembly with catalytic beds 127 in the interior of tubes 125' and steam in counterflow in the surrounding shell 126'. In an alternative embodiment the flow regions for the TCES fluid and the steam are reversed. For purposes of preliminary design, the shell-and-tube reactor is viewed as N small concentric tube reactors, as previously illustrated in FIG. 3. The fixed parameters are listed in Table 1.

TABLE 1

The fixed dimensions and properties of the reactor

| Fixed variables | Value |
|---|---|
| Steam tube wall thickness, $W_s$ (cm) | 2 |
| Gas mass flow rate, $\dot{m}_g$ (g/s) | 20 |
| Steam mass flow rate, $\dot{m}_s$ (g/s) | 21.6 |
| Inlet steam temperature, $T_{si}$ (° C.) | 350 |
| Outlet steam temperature, $T_{so}$ (° C.) | 650 |
| Inlet gas temperature, $T_2$ (° C.) | 597 |
| Steam pressure, $P_s$ (MPa) | 26 |
| Gas mixture pressure, $P_g$ (MPa) | 30 |
| Pre-exponential factor, $k_{o,n}$ (kg · m$^{-3}$ · s$^{-1}$) | 3.83 × 10$^{13}$ |
| Activation energy, $E_a$ (J/mol) | 1.83 × 10$^5$ |

Reactor Model

Gas flows in a tubular packed-bed catalytic reactor 114, which exchanges heat with steam (or other power block working fluid) through the wall of the gas tube 125. The pseudo-homogeneous steady state model is very commonly employed for designing packed bed reactors.

In the pseudo-homogeneous model, the catalyst bed 127 is treated as a continuum with averaged properties, i.e., effective conductivity ($k_{eff}$) and effective diffusivity ($D_{eff}$). Also, the model assumes: (1) negligible axial conduction, (2) gas pressure is constant for purposes of evaluating properties and reaction rate, (3) the average velocity and density are only functions of axial location, and (4) the radial gradients of specific heat, effective conductivity, and effective diffusivity are negligible. The governing equations for energy conservation can therefore be expressed as:

$$\rho v c_p \frac{\partial T}{\partial x} = \frac{1}{r}\frac{\partial}{\partial r}\left(k_{eff} r \frac{\partial T}{\partial r}\right) + \dot{r}''' \Delta H \quad (1)$$

The boundary conditions are:

$$T(r, x = 0) = T_{in} \quad (2)$$

$$-k_{eff}\frac{\partial T}{\partial r}\bigg|_{r_w} = q''_w$$

where $r_w$ is the inner wall radius, $q_w''=U_w(T_{cw}-T_s)$, and $U_w$ and $T_{cw}$ are the overall heat transfer coefficient and catalyst temperature at the wall.

The governing equations for mass conservation are:

$$\rho v \frac{\partial f_{NH3}}{\partial x} = \rho \frac{1}{r}\frac{\partial}{\partial r}\left(D_{eff} r \frac{\partial f_{NH3}}{\partial r}\right) + \dot{r}'' \quad (3)$$

The boundary conditions for mass conservation are:

$$f_{NH3}(r, x=0) = f_{NH3,in} \quad (4)$$

$$\left.\frac{\partial f_{NH3}}{\partial r}\right|_{r_w} = 0$$

The Temkin-Pyzhev intrinsic rate expression is used for the ammonia reaction:

$$\dot{r}'' = k_{0,m}\exp\left(-\frac{E_a}{R_u T}\right) \times \left[K_p^{-1} p_{N2}\left(\frac{p_{H2}^3}{p_{NH3}^2}\right)^{\alpha} p_o^{-(1+\alpha)} - \left(\frac{p_{NH3}^2}{p_{H2}^3}\right)^{1-\alpha} p_o^{(1-\alpha)}\right] \quad (5)$$

Here $p_o$ is the standard state pressure of 1 atm, explicitly included to make the dimensions consistent; $\alpha$ is an empirical parameter taken to be 0.5.

The total pressure has been assumed constant in the model. Using the well-known Ergun equation, the pressure drop is found to be at most 3 MPa under the conditions considered here, which may be neglected compared to the system pressure of 30 MPa.

The temperature of the steam is calculated from a cross-section averaged energy balance:

$$(\dot{m}c_p)_s \frac{dT_s}{dx} = q_w'' P \quad (6)$$

The heat transfer coefficient for the steam flow is calculated with the following equation:

$$h_s = \frac{Nu \cdot k_s}{D_h}, \; Nu = 0.023\, Re^{0.8}\, Pr^{0.4} \quad (7)$$

where Nu is the Nusselt number, $k_s$ is the average thermal conductivity of the steam, $D_h$ is the hydraulic diameter, Re is the Reynolds number based on the hydraulic diameter, and Pr is the Prandtl number.

Effect of Steam Heat Transfer Coefficient

Similar to a heat exchanger, the required surface area to heat the steam is expected to decrease as the overall heat transfer coefficient, U, increases. The overall heat transfer coefficient is related to the thermal resistances of the catalyst bed 127, the tube 126 wall properties, and the steam flow:

$$(UP)^{-1} = R_g' + R_w' + R_s' \quad (8)$$

$$= \frac{1}{h_g \pi D_g} + \frac{\ln[(D_g + 2W_g)/D_g]}{2\pi k_w} + \frac{1}{h_s \pi(D_g + 2W_g)}$$

where P is tube perimeter. The heat transfer coefficient, $h_s$ for the steam flow can be manipulated by changing the outer diameter of the steam tube, $D_s$; under laminar conditions the Nusselt number is constant, but for sufficiently small gap dimension the flow can be made turbulent, and the Nusselt number then increases with decreasing gap spacing. Table 2 shows the values of the steam tube diameter, $D_s$, that were selected to give steam heat transfer coefficients $h_s$ from 33.3 to 100 W·m$^{-2}$·K$^{-1}$ while fixing other properties and dimensions (listed in Table 1).

TABLE 2

Outlet conditions and required reactor length for different steam heat transfer coefficients

| $D_g$ (cm) | $W_g$ (cm) | $D_s$ (cm) | $h_s$ (W·m$^{-2}$·K$^{-1}$) | $T_3$ (°C.) | $f_{NH3,out}$ | L (m) | $V_w$ (m$^3$) |
|---|---|---|---|---|---|---|---|
| 10 | 1 | 16.8 | 33.3 | 459 | 0.500 | 38.2 | 0.58 |
| 10 | 1 | 14.6 | 66.7 | 457 | 0.497 | 22.1 | 0.31 |
| 10 | 1 | 13.8 | 100.0 | 454 | 0.495 | 16.8 | 0.22 |

After being preheated by steam in the secondary preheater 124, the TCES fluid, that is, the synthesis gas mixture (e.g., $N_2+3H_2$) enters the synthesis reactor 114 and begins flowing in the positive x-direction. As soon as the TCES fluid enters the reactor 114, it undergoes an abrupt temperature increase because of the rapid reaction rate caused by the elevated temperature. The steep temperature increase brings the TCES fluid close to equilibrium conditions and the reaction slows, but does not cease. Thereafter, the temperature of the reacting gases decrease along the reactor 114 length as they lose heat to the steam. In the current model, the steam enters the reactor 114 at about 350° C. and exits at about 650° C.

The ammonia mass fraction reaches the equilibrium curve almost immediately at the reactor 114 inlet and increases downstream along with the equilibrium curve. Under the conditions investigated, the synthesis process is essentially heat-transfer-limited, that is, the reaction rate is fast enough to maintain the reaction almost at equilibrium. The rate at which the reaction proceeds is then dictated by the rate at which heat is transferred to the steam, which reduces the TCES fluid temperature and increases the corresponding equilibrium ammonia mass fraction. The ammonia mass fraction deviates from the equilibrium curve near the outlet; the lowered temperature decreases the reaction rate so that it is no longer effectively infinite. The deviation from the equilibrium ammonia mass fraction was found to increase with increasing steam heat transfer coefficient $h_s$ since greater heat transfer tends to make the process more reaction-rate-limited than heat-transfer-limited.

As shown in Table 2, both the outlet temperature $T_3$ and the outlet ammonia mass fraction $f_{NH3,out}$ decrease slightly as the steam heat transfer coefficient $h_s$ increases. Most importantly, the required length decreases significantly. Of course, a shorter length will decrease material costs. The three main material costs are: the catalyst 127 which fills the tube 125; the tube 125 wall separating the TCES fluid and the steam (e.g., the inner wall), which sees a modest pressure differential of 4 MPa; and the outer wall 126 separating the steam from the environment, which sees a 26 MPa pressure differential. In this case, with diameter $D_g$ held fixed, both the catalyst volume and inner wall 125 material volume decrease in proportion to the reactor 114 length. The outer wall 126 material volume is given in the last column in Table 2 and is seen to decrease rapidly as $D_s$ decreases, due to both the reduced length and diameter. The only disadvantage to reducing the outer diameter is that it would also increase the pressure drop of the steam flow. However, this pressure drop is estimated to be significantly smaller than the pressure drop in the catalyst bed, and would therefore not impose too great a cost for pumping power. The conclusion is that the design should achieve a large steam heat transfer coefficient $h_s$ by minimizing the steam cross-sectional area.

Effect of Reactor Tube Diameter

Varying the inner tube 125 diameter, $D_g$, changes both steam and gas thermal resistances, the gas velocity (for fixed mass flow rate), and the catalyst volume. The impact of steam thermal resistance was established above, by varying $h_s$ while holding $D_g$ fixed. In the following discussion we hold steam thermal resistance fixed, so that we can explore the other effects of varying $D_g$. Since steam thermal resistance $R_s'$ depends on the product of the steam heat transfer coefficient and surface area, in this subsection we hold the product $h_s(D_g+2W_g)$ fixed. In order to hold this product fixed while varying $D_g$, we simultaneously vary $D_s$ to change $h_s$. The derivation uses the standard definition of hydraulic diameter for the outer annulus, $D_h=4A_c/P_w$, where $P_w=D_g+2W_g+D_s$ is the wetted perimeter. Then, with fixed steam mass flow rate, and assuming turbulent steam flow, the following relationships can be used to find the required $D_s$ for a given $D_g$:

$$Re_s \sim P_w^{-1}, Nu_s = \frac{h_s D_h}{k_s} \sim Re_s^{0.8}$$

$$\Rightarrow h_s(D_g + 2W_g) \sim \frac{D_g + 2W_g}{(D_g + 2W_g + D_s)^{0.8} (D_s - D_g - 2W_g)} = const.$$

due to the changing thermal resistance within the catalyst bed 127. In Table 3, the thermal resistance within the catalyst bed 127 is seen to decrease as $D_g$ decreases, which largely explains the shorter length required.

Similar to the behavior seen previously, decreasing $D_g$ improves heat transfer and increases the deviation from equilibrium.

Thinner (smaller diameter) reactors require less tube wall material and catalyst (last two columns). One downside to decreasing the reactor diameter is that the pressure drop would increase, requiring greater pumping power. While pressure has been held constant in the model for purposes of evaluating properties and reaction kinetics, the pressure drop has been calculated using the Ergun equation. Table 3 shows the increase in pressure drop of the reacting gas as the reactor diameter is decreased.

Tube Bundle Reactor We now discuss the alternative use of a tube bundle reactor, as shown in FIG. 4, wherein the TCES fluid flows in N reacting tubes 125' while the steam flows in the opposite direction in the space between the tubes 125' and the outer shell 126'. The number of reacting gas tubes 125' is varied while the cross-sectional areas for gas and steam are fixed. Also, the wall thickness of the reactor tube 125', $W_{g,N}$, is fixed to be 0.5 cm. Table 4 lists combinations of $D_{g,N}$, $D_{s,N}$, and $D_s$ that give fixed cross-sectional areas for different numbers of tubes, N.

TABLE 3

Comparison of outlet conditions, required reactor length, and material usage for different $D_g$ and $D_s$ combinations

| $D_g$ (cm) | $W_g$ (cm) | $D_s$ (cm) | $R_s'$ (W$^{-1}$ · cm · K) | $R_g'$ (W$^{-1}$ · cm · K) | $T_3$ (° C.) | $f_{NH3,\,out}$ | $\Delta P$ (MPa) | L (m) | $V_w$ (m$^3$) | $V_c$ (m$^3$) |
|---|---|---|---|---|---|---|---|---|---|---|
| 13 | 1 | 18.2 | 4.7 | 1.8 | 461 | 0.502 | 0.3 | 26.2 | 0.45 | 0.35 |
| 10 | 1 | 15.0 | 4.7 | 1.4 | 458 | 0.498 | 0.8 | 24.9 | 0.35 | 0.20 |
| 7  | 1 | 11.8 | 4.7 | 1.0 | 447 | 0.486 | 3   | 24.6 | 0.28 | 0.10 |

Table 3 lists three combinations of $D_g$ and $D_s$ that give fixed $h_s(D_g+2W_g)$ and corresponding model outputs. The last two columns in Table 3 are the wall material volume and catalyst volume, respectively.

TABLE 4

Comparison of outlet conditions and material usage for different tube bundle reactors

| N | $D_{g,N}$ (cm) | $D_{s,N}$ (cm) | $R_s'$ (W$^{-1}$ · cm · K) | $R_g'$ (W$^{-1}$ · cm · K) | $D_s$ (cm) | $T_3$ (° C.) | $f_{NH3,\,out}$ | $\Delta p$ (MPa) | L (m) | $V_w$ (m$^3$) |
|---|---|---|---|---|---|---|---|---|---|---|
| 1  | 9.49 | 14.14 | 6.05 | 1.23 | 14.14 | 457 | 0.498 | 1.1 | 30.0 | 0.35 |
| 6  | 2.87 | 6.22  | 2.94 | 0.28 | 15.3  | 452 | 0.494 | 0.5 | 13.5 | 0.19 |
| 8  | 2.35 | 5.50  | 2.10 | 0.22 | 15.6  | 449 | 0.489 | 0.4 | 9.83 | 0.14 |
| 10 | 2.00 | 5.00  | 1.59 | 0.19 | 15.8  | 444 | 0.484 | 0.3 | 7.63 | 0.12 |

As $D_g$ decreases, the required reactor 114 length decreases slightly. If the process were limited by reaction kinetics, we would see that the required volume would stay constant (i.e., residence time or space velocity would remain constant), necessitating an increase in length as diameter decreased. Instead, the behavior is predominantly a heat transfer effect Increasing the number N of tubes 125', which increases the heat transfer surface area, improves heat transfer and increases the deviation from equilibrium. As shown in the last column of Table 4, the wall material usage decreases as N increases. In this case, with the gas cross-sectional area held fixed the catalyst 127 volume decreases in proportion to the synthesis reactor 114 length. Furthermore, the gas pressure gradient does not change with the number N of tubes 125' since the cross-sectional area is fixed, therefore the pressure drop also decreases in proportion to length. The preliminary conclusion is that a bundle of tubes 125' is preferable to a single tube reactor, and that performance improves as N increases.

This ammonia synthesis reactor 114 design study demonstrates the viability of using ammonia as a thermochemical storage medium for the direct production of supercritical steam at temperatures above ° C. 600, for example temperatures about 650° C. or greater. The supercritical steam can be used with modern power blocks 200 for electricity generation.

An important consideration for the CSP system 100 is a suitable configuration for the TCES reservoir 106, which may operate at pressures of 30 MPa or greater. Options that take advantage of existing underground facilities include using caverns, for example salt caverns, or abandoned oil wells or hydraulically fractured rock systems. New construction options include constructing new caverns, or building one or more containment vessels, for example using pre-stressed concrete vessels. New well construction is an attractive option because there are well-developed technologies for well construction that have been developed over decades by the oil industry. However, the high pressure storage requirements for the TCES system described above are different from those encountered by the oil industry.

Figure 5:
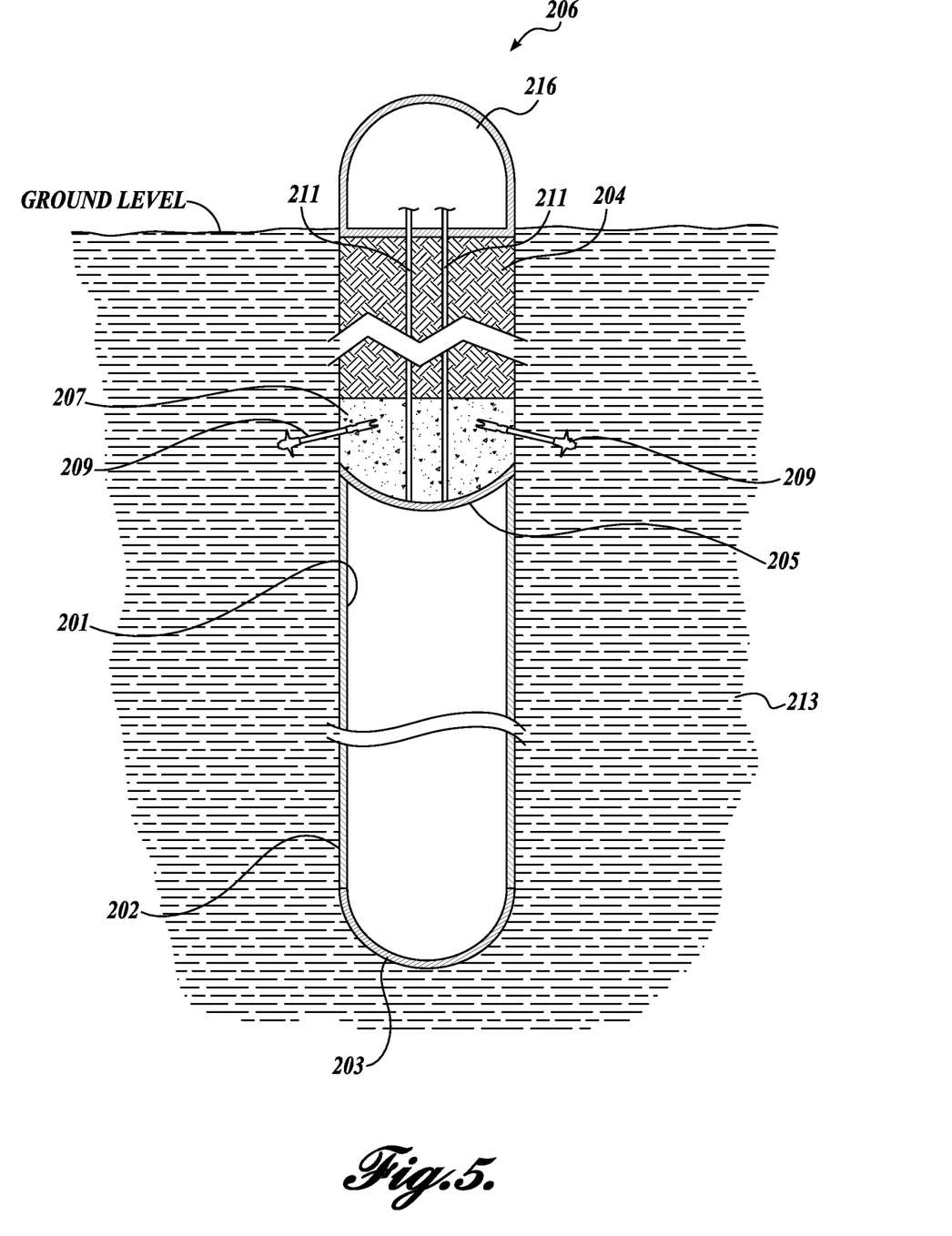
FIG. 5 shows an underground configuration for a thermochemical energy system fluid reservoir for the system shown in FIG. 1.

As shown in FIG. 5, a TCES fluid reservoir 206 may be constructed partially or fully underground to enhance the safety of the CSP system 100. The reservoir 206 is fully or partially underground, and uses ground pressure and/or mortar-compacted soil to aid in the pressure containment, permitting the reservoir wall thickness to be greatly reduced, thereby reducing system costs. Shaft boring machines for constructing suitable shafts, even in hard rock, are known in the art. See, for example, U.S. Pat. No. 8,439,450 to Harrison et al., which is hereby incorporated by reference, and U.S. Pat. No. 7,510,025 to Davies, which is hereby incorporated by reference in its entirety.

In one method of constructing a reservoir 206, a shaft is first bored into the ground, preferably substantially vertically and into sturdy ground such as hard rock 213. Commercially available shaft boring systems will produce suitable bore holes 202, for example having diameters in the range of 0.5 m to 7.5 m, or greater. The bore hole 202 depth may be, for example, in a range between about 100 m and 1,000 m, or greater. In an exemplary embodiment for a reservoir having a buried volume of approximately 21,000 $m^3$, a substantially vertical bore hole 202 having a diameter of about 5.5 m and a depth of 1,000 m is excavated. It is contemplated that more than one reservoir may be used for a particular CSP TCES system.

A wall casing 201, is constructed on the vertical wall of the bore hole 202, preferably grouting (not shown) the space between the casing 201 and the bore hole 202, so that the pressure forces from the reservoir are readily transmitted to the surrounding rock 213. An end cap 203 at a bottom of the casing 201 is similarly grouted and securely attached to the wall casing 201 to form a gas-tight seal. The upper end of the wall casing 201 may be well below ground level, for example 20 m to 100 m below ground level. Because the wall casing 201 is in contact with the rock walls 213 of the bore hole 202, the wall casing may be formed from relatively thin casing material, for example 0.5 to 3.0 cm thick steel, or a composite material. A top end cap 205 is fixed to an upper end of the wall casing 201. In this embodiment, a concrete plug 207 is formed over the top of end cap 205, and may be secured to the rock walls of the bore hole 202, for example with rock bolts 209 or other means, as are known in the art. One or more, preferably two or more, high pressure ports 211 extend through a top end cap 205 and the plug 207, to provide above ground fluid access to the reservoir 206 for injecting and releasing TCES fluid from the reservoir 206. The portion of the bore hole 202 above the concrete cap 207 is filled, for example with gravel, concrete, or excavated materials.

Optionally, a separated above-ground portion 216 of the reservoir 206 may be provided, and may be in fluid communication with the lower chamber through the ports 211. For example, in an embodiment using ammonia as the TCES fluid, the above-ground portion 216 may be configured to substantially contain the liquid ammonia, and the underground portion may be configured to substantially retain the gaseous hydrogen and nitrogen.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for heating a working fluid for a power block to a temperature greater than 600° C., the method comprising:
   providing a reservoir containing a thermochemical energy storage (TCES) fluid wherein the TCES fluid can transition between a higher-energy dissociated state and a lower-energy undissociated state;
   storing solar energy in the TCES fluid by flowing the TCES fluid from the reservoir through a dissociation reactor, wherein the dissociation reactor is configured to endothermically transition at least a portion of the TCES fluid flowing through the dissociation reactor from the undissociated state to the dissociated state when the dissociation reactor is irradiated with concentrated solar energy, and returning the TCES fluid to the reservoir;
   transferring at least a portion of the stored solar energy from the TCES fluid into a power block working fluid by flowing the TCES fluid in the dissociated state from the reservoir to a synthesis reactor, wherein the synthesis reactor is configured to exothermically transition at least a portion of the received TCES fluid from the dissociated state to the undissociated state, wherein the power block working fluid is configured to be heated by energy from the exothermic transition of the TCES fluid; and
   preheating the TCES fluid in the dissociated state flowing from the reservoir to the synthesis reactor with a portion of the heated power block working fluid, wherein the portion of the heated power block working fluid is flowed to the synthesis reactor after preheating the TCES fluid, and further wherein the power block working fluid is heated to a temperature greater than 600° C.

2. The method of claim 1, wherein the TCES fluid in the lower-energy undissociated state comprises ammonia, and the TCES fluid in the higher-energy dissociated state comprises nitrogen and hydrogen.

3. The method of claim 2, wherein the synthesis reactor comprises at least one catalyst that facilitates the synthesis of ammonia from hydrogen and nitrogen.

4. The method of claim 3, wherein the at least one catalyst comprises one or more of iron-oxide, nickel, iron-cobalt and ruthenium.

5. The method of claim 3, wherein the reactor comprises at least one inner tube containing a bed of the catalyst, and the TCES flows through the at least one inner tube, and an outer tube that surrounds the at least one inner tube, wherein the power block working fluid flows through the outer tube around the at least one inner tube such that heat is transferred from the at least one inner tube to the power block working fluid.

6. The method of claim 1, wherein the power block working fluid comprises steam or carbon dioxide.

7. The method of claim 6, wherein the power block working fluid is heated to a supercritical state by energy from the exothermic transition of the TCES fluid.

8. The method of claim 1, wherein the reservoir comprises a bored hole defining a cylindrical bore wall, a vessel comprising a side wall, wherein the side wall is in contact with the cylindrical bore wall, a lower end, and an upper cap fixed to an upper end of the side wall, such that the side wall, lower end, and upper cap define a sealed vessel, and further comprising at least one port through the upper cap that provides fluid communication with the sealed vessel.

9. The method of claim 8, wherein the side wall is grouted to the cylindrical bore hole wall.

10. The method of claim 8, wherein an upper end of the sealed vessel is disposed below ground level.

11. The method of claim 10, further comprising a concrete plug adjacent an upper side of the upper cap, wherein the concrete plug is secured to the cylindrical bore wall.

12. The method of claim 10, wherein the reservoir further comprises a separated above-ground portion.

* * * * *